(12) United States Patent
Horst et al.

(10) Patent No.: US 8,454,261 B2
(45) Date of Patent: Jun. 4, 2013

(54) SNAP-AND-CLICK HATRACK FASTENER

(75) Inventors: Markus Horst, Bad Oldesloe (DE);
Robert Hogh, Hamburg (DE)

(73) Assignee: Airbus Operations GmbH (DE)

( * ) Notice: Subject to any disclaimer, the term of this patent is extended or adjusted under 35 U.S.C. 154(b) by 491 days.

(21) Appl. No.: 12/562,245

(22) Filed: Sep. 18, 2009

(65) Prior Publication Data

US 2010/0074673 A1  Mar. 25, 2010

Related U.S. Application Data

(60) Provisional application No. 61/192,922, filed on Sep. 23, 2008.

(30) Foreign Application Priority Data

Sep. 23, 2008  (DE) .......................... 10 2008 048 499

(51) Int. Cl.
*B64C 1/06* (2006.01)
*F16B 21/00* (2006.01)

(52) U.S. Cl.
USPC ........ 403/321; 244/118.5; 244/131; 403/323; 403/324

(58) Field of Classification Search
USPC ............. 403/79, 84, 91–94, 96, 97, 150–154, 403/157, 161–163, 321, 322.1, 323, 324; 244/188.1, 118.4, 118.5, 131, 118.1
See application file for complete search history.

(56) References Cited

U.S. PATENT DOCUMENTS

| 5,048,239 A | * | 9/1991 | Filitz et al. .......................... 52/1 |
| 5,108,048 A | | 4/1992 | Chang |
| 6,546,584 B2 | * | 4/2003 | Hobden ........................ 15/144.1 |
| 7,334,956 B2 | * | 2/2008 | Taylor .............................. 403/87 |
| 2004/0258460 A1 | * | 12/2004 | Taylor .............................. 403/79 |
| 2005/0236523 A1 | * | 10/2005 | Schwartz et al. ............. 244/119 |
| 2007/0284479 A1 | | 12/2007 | Pein et al. |
| 2008/0061202 A1 | * | 3/2008 | Costabel et al. ........... 248/230.7 |
| 2008/0277527 A1 | | 11/2008 | Fokken et al. |
| 2009/0179111 A1 | * | 7/2009 | Ebner et al. ................... 244/131 |
| 2009/0261202 A1 | * | 10/2009 | Horst et al. .................... 244/131 |
| 2009/0277369 A1 | * | 11/2009 | Gai et al. ....................... 114/286 |
| 2011/0239439 A1 | * | 10/2011 | Maxwell et al. ........... 29/525.02 |

FOREIGN PATENT DOCUMENTS

| DE | 10 2005 054 890 | 5/2007 |
| DE | 10 2006 016 509 | 10/2007 |
| EP | 0514957 A1 | 11/1992 |
| WO | 2007/057191 | 5/2007 |

* cited by examiner

*Primary Examiner* — Victor MacArthur
(74) *Attorney, Agent, or Firm* — Lerner, David, Littenberg, Krumholz & Mentlik, LLP

(57) ABSTRACT

The invention relates to a fastening device for installing a hatrack on a substructure of a means of locomotion, wherein the fastening device comprises a pre-locking device and a main locking device. In this arrangement the pre-locking device is designed for automatic provisional affixation of the hatrack to the fastening device when the hatrack during an installation movement of the hatrack is moved in the direction to the fastening device. The main locking device is designed for final affixation of the hatrack to the fastening device.

8 Claims, 8 Drawing Sheets

SNAP-AND-CLICK HATRACK FASTENER

This application claims the benefit of the filing date of U.S. Provisional Patent Application No. 61/192,922 filed Sep. 23, 2008, the disclosure of which is hereby incorporated herein by reference.

BACKGROUND OF THE INVENTION

The invention relates to the installation of hatracks in a means of locomotion. In particular, the invention relates to a fastening device for installing a hatrack on a substructure of a means of locomotion, to a hatrack comprising a fastening device, to an aircraft comprising a hatrack, to the use of a fastening device in an aircraft, to a method for installing a hatrack to a fastening device, and to a method for deinstalling a hatrack from a fastening device.

In present-day means of locomotion, for example in aircraft, omnibuses, rail vehicles or ships, hatracks are installed near ceilings of, for example, passenger cabins, which hatracks provide a means of storing items of baggage. These hatracks can mostly be closed by means of a flap so as to prevent these items of baggage or other objects held in the hatracks from falling from the hatrack, especially when the means of locomotion is in operation.

Such hatracks are suitable for carrying considerable loads. The resulting considerable static forces and the considerable dynamic forces caused in operation are in the most direct possible way introduced to a structure that is suitable for this, for example frame elements and/or stringers of an aircraft fuselage. Furthermore, it can be possible to introduce these forces into a substructure, for example because the substructure provides more suitable attachment options for receiving the hatracks, wherein the substructure then in turn, as a rule, is directly connected to the frame elements and/or stringers.

In order to attach the hatracks to the respective structures or substructures, the hatracks are mostly suspended from these structures either by means of screw-type connections or, as is common in aircraft construction, by means of so-called tie rods. Because technical operating equipment, for example cables or switches, can be located behind the hatracks, these hatracks are attached in a deinstallable manner.

However, it has been shown that the installation and also the deinstallation of such hatracks can be time-consuming and labour-intensive. At least in aircraft construction, as a rule at least one first installer needs to position the hatrack to be installed, and at least one second installer needs to connect the hatrack by means of suitable connection materials to the corresponding structure or substructure. Thus, as a rule, at least two technicians are required to carry out the installation.

Thus DE 10 2005 054 890 A1, which is also published as WO 2007/057191 A1, describes an attachment structure for fixing internal equipment components in a passenger cabin of an aircraft fuselage structure, which among other things is formed by frame elements that are arranged so as to be spaced apart from each other in longitudinal direction of the aircraft fuselage. DE 10 2006 016 509 A1, which has also been published as US 2007/0284479 A1, in turn describes a quick-release fastening system for mounting an element to a fastening structure.

BRIEF SUMMARY OF THE INVENTION

Accordingly, it is the object of the invention to state a simple and preferably detachable attachment of a hatrack to a structure or substructure, which attachment can preferably be carried out by means of only one installer.

According to an exemplary embodiment of the invention, a fastening device for installing a hatrack to a substructure of a means of locomotion comprises a pre-locking device and a main locking device. In this arrangement, the pre-locking device is designed for automatic provisional affixation of the hatrack to the fastening device when the hatrack during an installation movement of the hatrack is moved in the direction of the fastening device. The main locking device is designed for final affixation of the hatrack to the fastening device.

As a rule, the hatrack is an overhead bin that can preferably be closed by means of a hinged cover or a flap.

By means of this arrangement, installation of the hatrack by only one technician is possible. In a first work step the technician moves the hatrack so that it engages the pre-locking device. From this point in time onwards the technician's hands are free because the hatrack is provisionally affixed so that in a second work step said technician can finally affix the hatrack, by means of the main locking device, to the fastening device or to the substructure.

In addition, this arrangement ensures that deinstallation of the hatrack is also possible by means of only one technician. In this process the technician disengages the main locking device at the fastening device so that the hatrack is then only held by the pre-locking device. In the next work step the technician releases the pre-locking device and removes the hatrack from the fastening device.

According to a further exemplary embodiment of the invention, the fastening device is provided for snap-and-click installation of the hatrack to the substructure of the means of locomotion. The fastening device comprises a fork head with a fork that is formed by two limbs, wherein each limb comprises an opening. Furthermore, the fastening device comprises a main bolt that constitutes the main locking device and that is movable, along its longitudinal direction of extension, between a locked position and an unlocked position, wherein the main bolt in the locked position is held in the openings of both limbs, and in the unlocked position is held only in the opening of one of the limbs. Furthermore, the fastening device comprises an eye that is designed such that in an installed state it can be received between the two limbs of the fork head, wherein the main bolt in the locked position engages the eye in such a way that the eye is connected to the fork head, and wherein the main bolt in the unlocked position completely releases the eye. Finally, the fastening device comprises a pre-locking device with a pressure member, or a thrust piece, wherein the pre-locking device on at least one of the limbs of the fork head is designed and arranged in such a way that the pressure member can be dislocated between a locking position and a release position and that when the main bolt is in the unlocked position and the pressure member is in the locking position, the eye rests in a pre-locking position on the pressure member, and that when the main bolt is in the unlocked position and the pressure member is in the release position the eye is completely released.

A main aspect of the invention can be considered to be based on the following idea:

The invention can bring about a situation in which a hatrack in an aircraft can be installed and deinstalled in a simpler manner, i.e. as already mentioned above, preferably by means of only one technician. To this effect a fastening device is proposed by means of which a storage bin can be installed in a snap-and-click manner to a retaining structure on a vehicle, wherein the hatrack can at first snap or click into a so-called pre-locking position in which said hatrack in its only lightly loaded state, for example empty state, is held to the retaining structure, and subsequently a main bolt can be slid into place, which main bolt can cause the actual force transmission to the retaining structure also in the heavily loaded state. Such a fastening device arrangement is at times also referred to as a snap-and-click fastening device arrangement.

As a rule, the hatrack is attached to the structure or the substructure by means of four fastening devices. It is of no consequence whether it is the eye or the fork head that is attached to the hatrack, with the appropriate counter-part being attached to the structure. The advantages resulting from the fastening device according to the invention are to be explained with reference to installation and deinstallation, wherein the explanation is based on the fork head being attached to the structure, and the eye being attached to the hatrack.

For installation of one of the hatracks the main bolt rests in the unlocked position thus releasing the entire width between the two limbs of the fork head. The pre-locking device is in the locking position so that the pressure member projects into the fork of the fork head. When the eye is led into the fork, the eye dislocates the pressure member at least to near the release position and reaches the locking position for the first time when an opening that is located in the eye reaches the pressure member, and for the second time when the eye has been moved completely beyond the pressure member. In this so-called pre-locking position the eye, or the hatrack attached to said eye, rests on or is held on the pressure member. This procedure is carried out on all the fastening devices. It may depend on the installation situation as to whether in a first installation step the eye on all the fastening devices is at first only inserted to such an extent that the pressure member of the pre-locking device moves into the opening of the eyes, thus securing the hatrack in this position, and in a second work step the hatrack is then guided on all the fastening devices right to the pre-locking position, or whether the hatrack on all the fastening devices by means of a single installation step is moved right to the pre-locking position. After the hatrack has reached the pre-locking position, the main bolt, which is in the unlocked position, is moved through the opening of the eye, which opening is now in front of the main bolt, and through the opening of the second limb into its locked position. This installation step ends the installation procedure. The main bolt, which is more strongly dimensioned when compared to the pressure member, takes up the static and dynamic forces that act on the hatrack during operation, and introduces said forces to the substructure by way of the fork head. In this arrangement, the substructure can be connected to the primary structure of the vehicle, either so as to be fixed or by means of tie rods.

Reconfiguration, for example, of a passenger cabin in an aircraft, or carrying out repair and maintenance work may necessitate deinstallation of the at least one hatrack.

In order to deinstall one of the hatracks, first the main bolt is moved from its locked position to the unlocked position. In the unlocked position the main bolt completely releases the eye. The eye then rests on the pressure member of the pre-locking device that is in the locking position. By moving the pressure member from the locking position to the release position, here again the eye is completely released. After this unlocking process has been completed, the eye can be removed from the fork of the fork head. After this deinstallation step has been carried out on all the fastening devices, the hatrack is no longer connected to the structure. This deinstallation step completes deinstallation of the hatrack.

According to a further exemplary embodiment of the invention, on one end of the pressure member of the pre-locking device that is arranged on the fastening device, an inclined surface has been formed. In this arrangement the inclined surface has been designed in such a way that when the pre-locking device is in the locking position, the inclined surface makes it possible to slide the eye into the fork of the fork head while at the same time preventing withdrawal of the eye from the fork. Thus when the eye is pushed into the fork of the fork head, the pressure member is dislocated from its locking position at least to near the release position. The inclined surface thus points in the direction of slide-in of the eye. In order to ensure the function of the pressure member with the inclined surface, the pressure member can be arranged so that it is nonrotational relative to the fork of the fork head.

According to a further exemplary embodiment of the invention, the pressure member of the pre-locking device that is arranged on the fastening device can be locked in the release position. This ensures that during deinstallation of the hatrack, when the main bolt is in the unlocked position and the eye is threaded from the fork of the fork head, the eye does not encounter any projections with which it can become wedged.

According to a further exemplary embodiment of the invention, when the eye is in the pre-locking position, as a result of dislocation of the main bolt from the unlocked position through the eye and into the locked position, relief between the pressure member and the eye takes place. Thus the pre-locking device can be more lightly built when compared to the main bolt, because during installation or deinstallation the pre-locking device only needs to carry the weight of the empty hatrack, as a rule without dynamic effects, and ideally is only arranged on one of the two forks. In the locked position the main bolt is supported by both forks of the fork head. As a rule, all the static forces that act on the hatrack, in other words both the intrinsic weight of the hatrack and the additional load or payload, and the forces that dynamically act on the hatrack including the additional load, are introduced into the structure through the main bolt and the fork by way of the fork head.

According to a further exemplary embodiment of the invention, the pressure member of the pre-locking device is pre-tensioned in the direction of the locking position. Thus, in order to move the pressure member from the locking position to the release position, the pressure member is dislocated against the direction of pre-tension. Thus when the eye during installation of the hatrack is guided into the fork of the fork head, the pressure member, as a result of its inclined surface, while generating an additional force at the eye, is pushed back against this direction of pre-tension. In a counter move, if no force acts on the inclined surface, as a result of pre-tension which as a rule is exerted by a spring, the pressure member is pushed into its locking position. Thus it can be ensured that the pressure member, when it is not in the release position, is in the locking position rather than taking up some undetermined intermediate position. Thus in particular during deinstallation of the hatrack, when the main bolt has been dislocated to the unlocked position, it can be ensured that the eye and the pre-locking position engage each other in such a way that unintended detachment of the eye and thus of the hatrack from the pre-locking position is impossible.

According to a further exemplary embodiment of the invention, at least one of the facing interior walls of the limbs of the fork of the fork head comprises a groove in such a way that during installation the eye is guided by the groove into the pre-locking position. This ensures that the eye is inevitably guided into its pre-locking position.

Advantageously both interior walls comprise grooves so that the eye is guided both on its front and on its rear. Double-sided guidance of the eye can ensure that in the pre-locking position both the front and the rear opening of the eye come to rest above the openings of the fork. This makes it easier, when the eye has reached the pre-locking position, to dislocate the main bolt from its unlocked position through the opening of the eye into its locked position.

According to a further exemplary embodiment of the invention, at least one of the grooves comprises insertion aids. They can be arranged in such a way that in the region that first establishes contact with the eye the groove is inclined across the direction of insertion. This incline can considerably facilitate insertion of the eye into the groove since the eye is then quasi-caught by the insertion aid and guided to its final pre-locking position. There is thus largely no need to thread the eye into the groove.

In a further exemplary embodiment of the invention, the limb of the fork of the fork head on which the pre-locking device is arranged comprises a main-bolt securing device that is dislocatable between an engaged position and a disengaged position, which main-bolt securing device, when the main-bolt securing device is in the engaged position secures the main bolt at least in either the locked position or the unlocked position. In this way it can be ensured that the main bolt, when it is thus subjected to loads by the hatrack with any additional items of baggage, remains in the locked position rather than, during operation, for example due to any vibration, independently moves in the direction of the unlocked position.

Securing the retaining bolt in the unlocked position also ensures that when in addition the pre-locking device is in the release position, the eye can be freely moved within the fork. This can be useful so that when the hatrack or the eye, for example due to twisting or warping, cannot be released from the fork of the fork head, the technician who carries out deinstallation will know that s/he may apply more force to release the hatrack, without having to expect damage to the hatrack and/or to the fastener as a result of a projecting main bolt.

In the engaged position the main-bolt securing device is pushed against the external contour of the main bolt, for example by a spring. In the disengaged position the main-bolt securing device completely releases the main bolt.

According to a further exemplary embodiment of the invention, the main bolt comprises a flat part which the main-bolt securing device engages when the main bolt is in the locked position and the main-bolt securing device is in the engaged position, and wherein the main-bolt securing device being released as a result of the main bolt being rotated. This way of securing the main bolt ensures that by means of a rotational movement the main bolt can be dislocated from a secure position to a released position and from there to the unlocked position. In order to be able to carry out the rotary movement a securing device installed on the main bolt, which securing device can for example be a push button that is radially affixed to the main bolt in radial direction and that is resilient, is dislocated by the technician. When the main bolt is in the locked position the push button possibly snaps into an opening or into a groove of a sleeve that can be firmly connected to the limb of the fork of the fork head, which limb receives the pre-locking device, in order to, in the non-operated position, stop said rotary movement. This rotary movement and the subsequent pulling movement can be carried out with one hand; there is no need to use the second hand as well. Thus, in cases where deinstallation of the hatrack is carried out by only one technician, the hatrack can be supported with the second hand, for example in order to facilitate movement of the main bolt from the locked position to the unlocked position.

Advantageously, one end of the main bolt is shaped in such a way that when the main-bolt securing device is in the engaged position the main-bolt securing device prevents dislocation of the main bolt beyond the unlocked position. This can substantially facilitate finding the unlocked position of the main bolt. The technician tasked with deinstalling the hatrack can dislocate the main bolt from the locked direction to the unlocked position until the main bolt can no longer be dislocated. The technician thus knows that when blocking of the main bolt during dislocation occurs the main bolt has reached the unlocked position.

In order to be able to remove the main bolt, for example for service purposes, it is possible, for example, by means of an operating tool that is affixed to the main-bolt securing device, to dislocate the main-bolt securing device with one hand to the disengaged position in order to, with the other hand, dislocate the main bolt beyond the unlocked position.

According to a further exemplary embodiment of the invention, the pre-locking device and the main bolt are to be dislocated in the same direction in order to reach the release position or unlocked position. Thus the technician charged with deinstalling the hatrack can operate from one side both the main bolt and the pre-locking device. This can make it considerably easier for the technician to carry out the work.

According to a further exemplary embodiment of the invention, the fork head is connected to a base body that is firmly connected to the substructure in such a way that the fork head can be dislocated relative to the base body. Thus, for example, the various fork heads that are to be arranged on a common hatrack can be adjusted to any spacing that exists between the eyes that are firmly connected to the hatrack. In this way it is possible, for example, to compensate for production tolerances or to correct gap dimensions between the individual adjacent hatracks. Depending on the requirements and arrangement, dislocation can be carried out in the longitudinal- and/or transverse direction of extension of the hatrack. For dislocation in the longitudinal- and transverse direction of extension, the fork head can, for example, be connected to a cross adjustment device that comprises two adjustment devices with advantages as described in the following paragraphs.

According to a further exemplary embodiment of the invention, the fastening device furthermore comprises two limbs that at least in partial regions are parallel, which limbs are connected to one side of the base body, wherein each limb comprises an opening, and wherein the two openings are aligned. Furthermore, the fastening device comprises an arbor that is rotatably held in the two openings. In addition there is a bush, between the limbs, with an external thread, wherein the bush is firmly connected to the arbor, and the bush is rotatable between the limbs without there being any play. The fork head comprises an internal thread such that the internal thread of the fork head engages the external thread of the bush. Furthermore, the fork head is designed such that by rotating the arbor the fork head can be dislocated between the limbs along the arbor. The connection between the arbor and the bush can, for example, take place by way of a clamping sleeve or a grooved pin. The hole that is required to accommodate the connection element can extend across the direction of longitudinal extension of the arbor.

If a hatrack, is attached with, for example, three or four fastening devices to the substructure, possibly only two fastening devices are designed in the form described above. The remaining fastening device or fastening devices can be designed in such a way that the fork head can slide on the arbor between the limbs wherein the arbor being disconnectably connected to the limbs of the base body. This arrangement is, for example, achievable in that the fork head comprises a through-hole instead of an internal thread. Thus during installation of the hatrack the fork head of this fastening device adjusts the actual distance of the eyes attached to the hatrack. As a result of this the hatrack can on the one hand be installed without any tension, and on the other hand as a result of this arrangement, for example, any changes in length that occur during operation as a result of temperature differences or distortion can automatically be compensated for.

According to a further exemplary embodiment of the invention, the arbor comprises two ends, wherein on one end a tool holding fixture and on the other end there is a blocking device that prevents independent rotation of the arbor. Thus, independent rotation of the arbor, after positioning of the fork head by rotating said arbor, during operation, for example as a result of vibration, is prevented.

The tool holding fixture can, for example, be designed as a hexagonal head.

The blocking device is, for example, designed as a spur-toothed gearwheel which is butt-joined to one end of the arbor, wherein a pre-tensioned pressure member protrudes between the teeth. During rotation of the arbor or of the gearwheel this pressure member is forced back against its direction of pre-tension, by a tooth face, and after overcoming the tooth presses between the adjacent pair of teeth due to pre-tension. The blocking device can also be designed in such a way that instead of a gearwheel, the edge of the arbor comprises, for example, knurling or a cylinder with radial holes, in which the pressure member engages the holes and in this way secures the selected setting of the fork head.

According to a further exemplary embodiment of the invention, the fork head and the base body are designed so as to engage each other in such a way that forces from the fork head can be transferred to the base body. This ensures that rotary forces around the arbor do not result in the fork head rotating relative to the base body. On the one hand such forces can occur during the adjustment procedure during which the fork head is adjusted relative to the base body. On the other hand such forces can occur during operation while longitudinal forces and/or transverse forces acting on the hatrack manifest themselves in the above-mentioned torsional forces. These torsional forces can, for example, be introduced in the base body in that the fork head comprises a U-shape that extends along the internal thread and that is open in the direction of the base body, wherein the base body is located between the limbs that form the U-shape. Thus, during adjustment, the fork head is guided, by the U-shape, relative to the base body, by the arbor across the direction of extension of the arbor.

According to a further exemplary embodiment of the invention, a hatrack is stated that comprises a fastening device as described above.

According to a further exemplary embodiment of the invention, an aircraft with a hatrack described above is stated.

According to a further exemplary embodiment of the invention, the fastening device according to the invention is used in an aircraft.

All the characteristics that are described above and below in relation to the functional characteristics of the fastening device can also be implemented in the installation method and in the deinstallation method and vice versa.

According to a further exemplary embodiment of the invention, a method for installation of a hatrack on a fastening device is provided. This method comprises movement of the hatrack in the direction of the fastening device, automatic provisional affixation of the hatrack by means of a pre-locking device, and final affixation of the hatrack by means of a main locking device.

According to a further exemplary embodiment of the invention, a method for deinstalling a hatrack from a fastening device is stated. This method comprises releasing a main locking device, dislocating the hatrack from a final affixation position to a provisional affixation position, undoing the pre-locking device, and removing the hatrack from the fastening device.

Further details and advantages of the invention are provided in the subordinate claims in conjunction with the description of an exemplary embodiment that is explained in detail with reference to the drawings.

DETAILED DESCRIPTION

Figure 1:
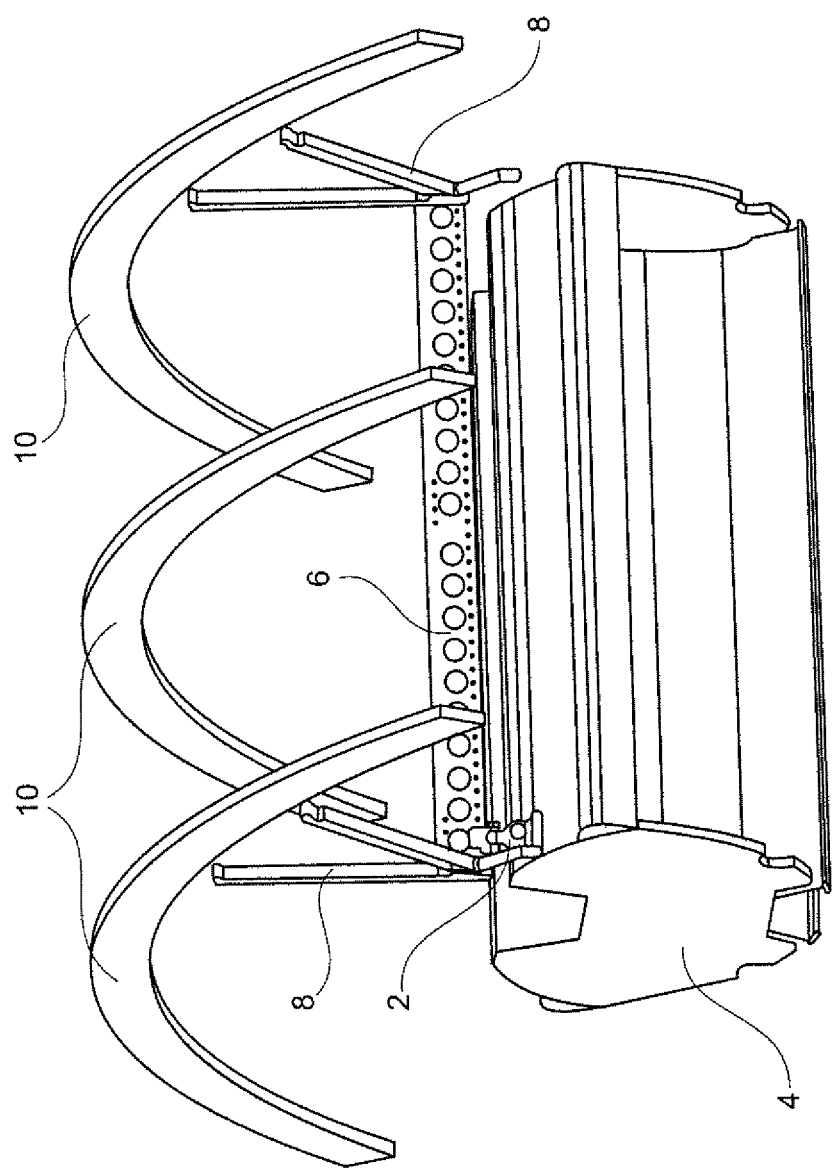
FIG. 1 shows a three-dimensional view of a fastening device according to an exemplary embodiment of the invention between a hatrack and a substructure.

It should be mentioned that identical components in the figures have the same reference characters and that the drawings are only diagrammatic and not necessarily to scale.

FIG. 1 shows a fastening device 2 between a hatrack 4 and a substructure 6 that is formed by a U-shaped profile. The substructure 6 is connected to a primary structure by means of tie rods 8, with the primary structure in the present example being formed by frame elements 10 of an aircraft.

Figure 2:
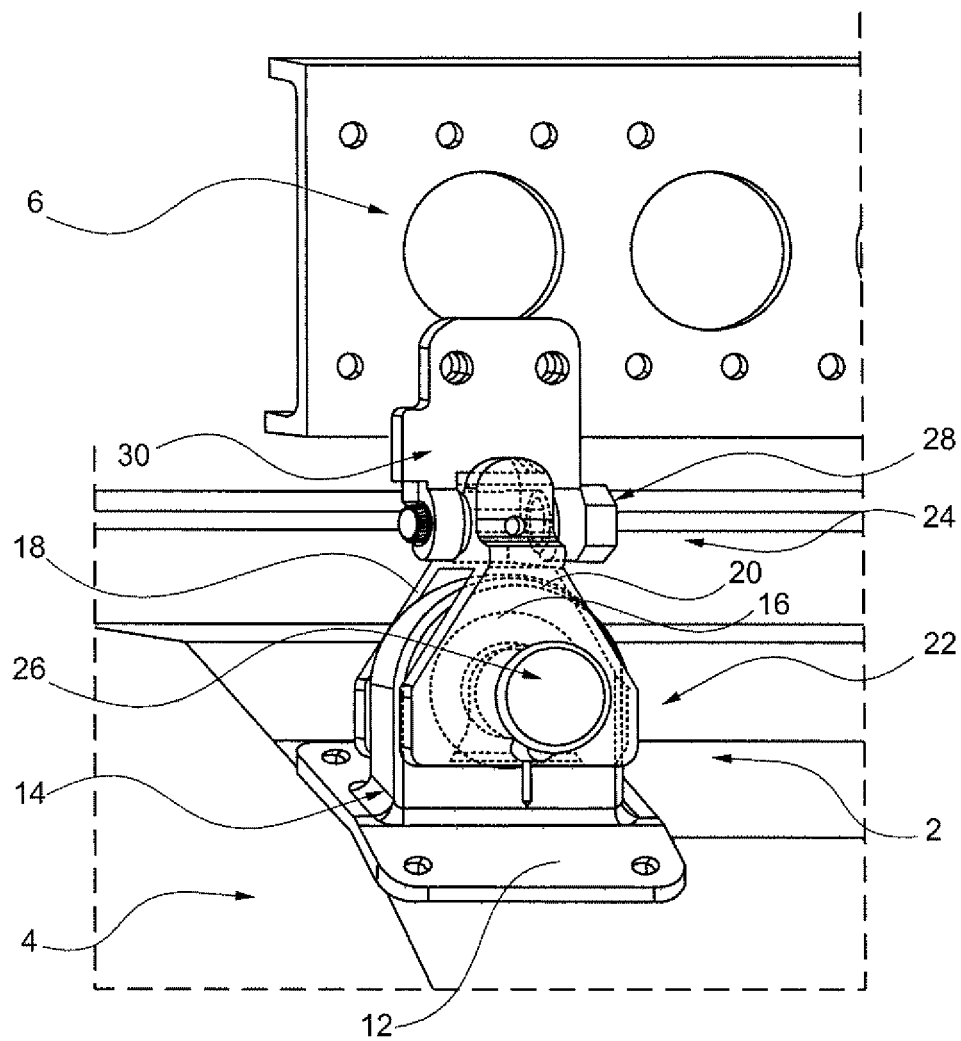
FIG. 2 shows an enlarged view of the fastening device from FIG. 1.

FIG. 2 shows an enlarged view of the fastening device 2 from FIG. 1. The fastening device 2 in its principle constituents comprises an attachment plate 12 that is connected to the hatrack 4, with a web 14 being formed to the attachment plate 12, which attachment plate 12 in the centre receives an eye 16. The eye 16 is located between a left-hand limb 18 and a right-hand limb 20, which together form a fork 22. The fork 22 forms part of a fork head 24. In the installed state the hatrack 4 is held by a main bolt 26 that detachably attaches the eye 16 between the two limbs 18, 20. By means of an arbor 28 the fork head 24 is connected to a base body 30. The base body 30 in turn, by means of connection elements (not shown) is attached to the substructure 6.

Figure 3:
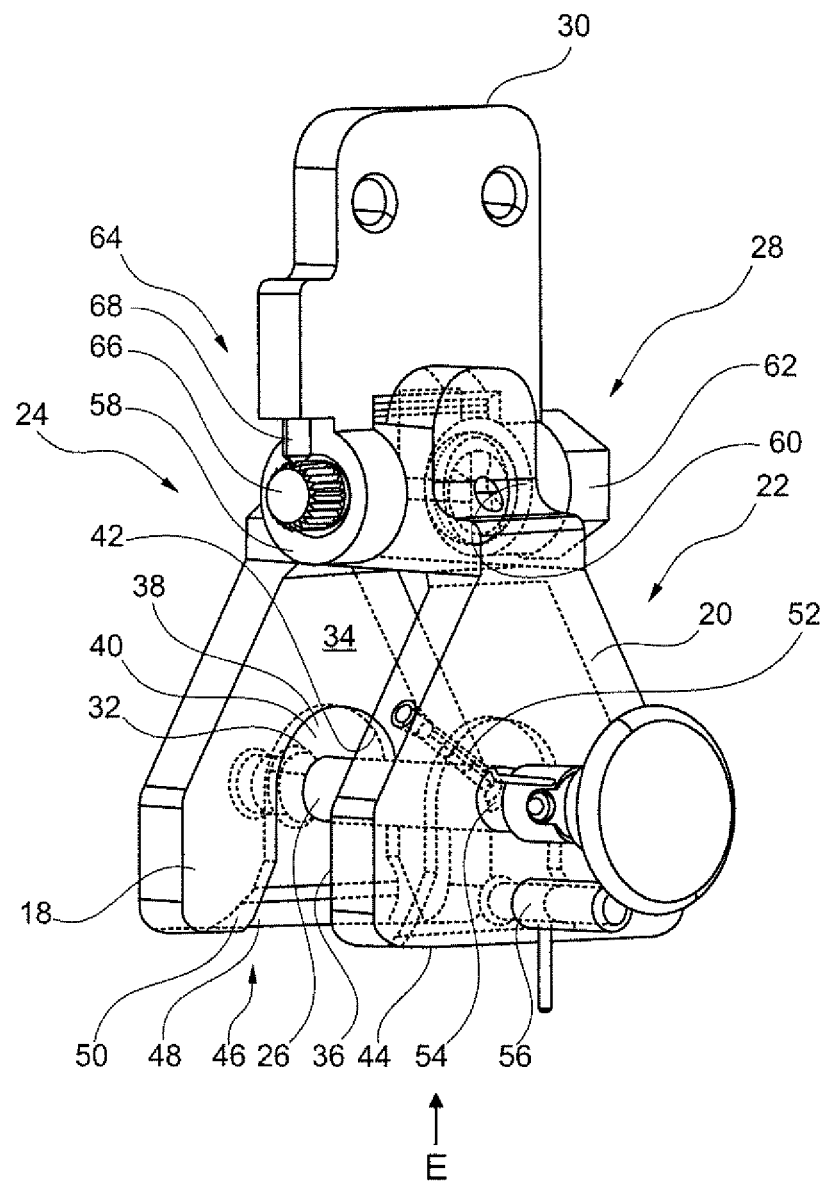
FIG. 3 shows a three-dimensional view of the fastening device from FIG. 1 without the hatrack.

FIG. 3 shows the fastening device 2 in the installed position without the hatrack 4 and without the eye 16 that engages the region between the two limbs 18, 20. The main bolt 26 is in a locked position. In this arrangement the main bolt 26 is held both in a transverse hole 32 of the left-hand limb 18 and of the right-hand limb 20. The interior walls 34, 36 of the two limbs 18, 20 each comprise a rectangular groove 38 that is open in the direction of insertion E. The rectangular groove 38 comprises a groove bottom 40 that is delimited by a groove wall 42, which groove bottom 40 extends parallel to the interior wall 34, 36. Furthermore, the groove 38, at its edge 44 facing the direction of insertion E, comprises an insertion aid 46. The insertion aid 46 comprises an inclined insertion surface 48 by means of which the depth of the groove 38 is increased relative to the interior wall 34, 36, as well as an inclined insertion surface 50 that increases the space between the groove walls 42 that face each other in a limb 18, 20 and the edge 44.

In the right-hand limb 20, furthermore, there is a main-bolt securing device 52 which pushes onto a flat part 54 of the main bolt 26. The pre-tension with which the main-bolt securing device 52 pushes onto the main bolt 26 is adjustable. Furthermore, in the right-hand limb 20 there is a pre-locking device 56. This pre-locking device 56 is arranged in the right-hand limb 20 in such a way that the directions of longitudinal extension of the main bolt 26 and of the pre-locking device 56 extend parallel. Furthermore, the pre-locking device 56 is located below the main bolt 26 when viewed in the direction of insertion E.

On the side facing the direction of insertion E the base body 30 comprises two limbs 58 that extend parallel to each other. Each limb 58 comprises a transverse hole 60 whose position is flush relative to each other. In the two transverse holes 60 the arbor 28 is rotatably held. At one end the arbor 28 comprises a hexagonal head 62 to receive an operating tool, for example a matching hexagonal spanner or wrench. On the other end of the arbor 28 a blocking device 64 is arranged. This comprises a spur-toothed gearwheel 66 that is firmly butt-joined to the arbor 28 and further comprises a locking element 68 that in a pre-tensioned manner projects between two adjacent teeth of the gearwheel 66.

Figure 4:
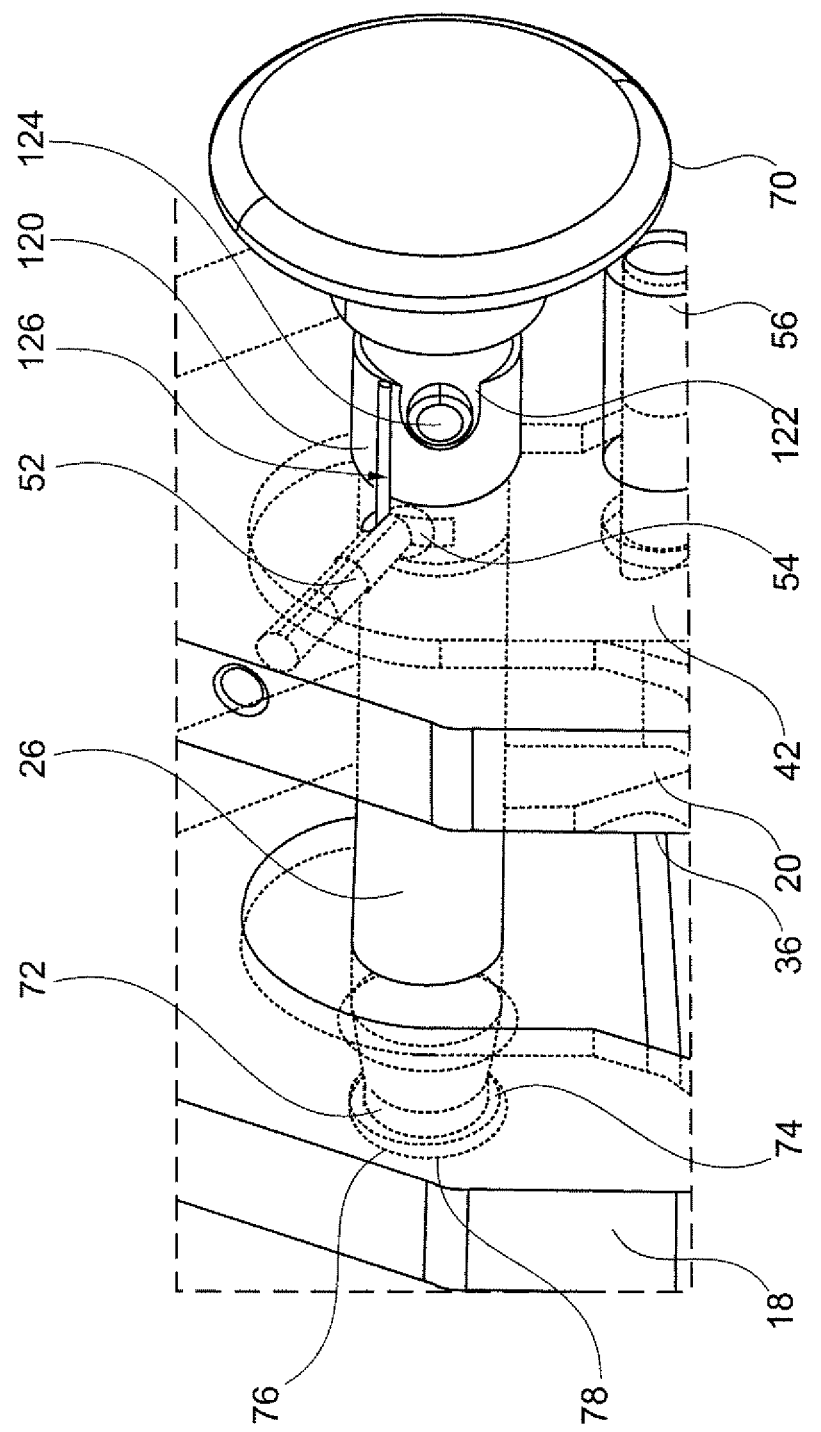
FIG. 4 shows a three-dimensional view of the main bolt of a fastening device according to an exemplary embodiment of the invention.

FIG. 4 shows the main bolt 26 of the fastening device 2 in the locked position. In this arrangement there is an operating knob 70 on the end of the main bolt 26, which end faces the right-hand limb 20. The end opposite the operating knob 70 shows a circumferential groove 72 in the main bolt 26. When viewed from the direction of the operating knob 70, there is a projection 74 behind the groove 72, which projection 74 is firmly connected to the main bolt 26. Behind the projection 74 a cone 76 is arranged. Furthermore, a sleeve 120 is firmly connected to the right-hand limb 20, which sleeve 120 extends in the direction of longitudinal extension of the main bolt 26 in the direction of the operating knob 70. Crossing the insertion direction E, in the sleeve 120 there is an opening 122 in the form of a groove. A sprung push button 124 projects into this groove 122, which push button 124 is firmly connected to the main bolt 26. In addition, an operating device 126 is formed to the main-bolt securing device 52. By means of the operating device 126 the main-bolt securing device 52, which is in an engaged position, can be dislocated to a disengaged position, without it being possible for the main-bolt securing device 52 to be affixed in this disengaged position.

When the main bolt 26 is dislocated from its locked position to its unlocked position, to this effect one hand pushes the push button 124 against the spring force into the main bolt 26 until the push button 124 no longer engages the opening 122. Subsequently the same hand rotates the operating knob 70 of the main bolt 26 until the main securing bolt 52 no longer engages the flat part 54. In this rotated position the main bolt 26 can be dislocated to the unlocked position. In the unlocked position the main securing bolt 52 engages the groove 72, and in this position secures the main bolt 26. Further withdrawal of the main bolt 26 leads to the main-bolt securing device 52 running against the projection 76 which then prevents the main bolt from being able to be pulled out any further from the right-hand limb 20. When the main bolt 26 is in its unlocked position, the bolt is pulled back far enough for the highest point 78 of the cone 76 to be either flush with the groove bottom 40 of the right-hand limb 20 or to be further back relative to the groove bottom 40, in the direction of the operating knob 70.

In order to remove the main bolt 26, the main-bolt securing device 52 is dislocated to the disengaged position by means of the operating device 126. The main bolt 26 can now be dislocated beyond the unlocked position.

To dislocate the main bolt 26 from the unlocked position to the locked position, the main bolt 26 is dislocated until the push button 124 comes to rest in the opening 122 as shown in FIG. 4. In this locked position the main-bolt securing device 52 engages the flat part 54, and engagement of the push button 122 with the opening 124 prevents relative rotation of the main bolt 26 relative to the fork head 24. Since the position of the push button 124 and thus of the main bolt 26 relative to the limb 20 is visible to the installing technician, said technician can thus also check that the main bolt 26 is secured by the main-bolt securing device 52.

When viewed from the direction of insertion E, underneath the main bolt 26 there is the pre-locking device 56, which is described in detail in the following figure.

Figure 5:
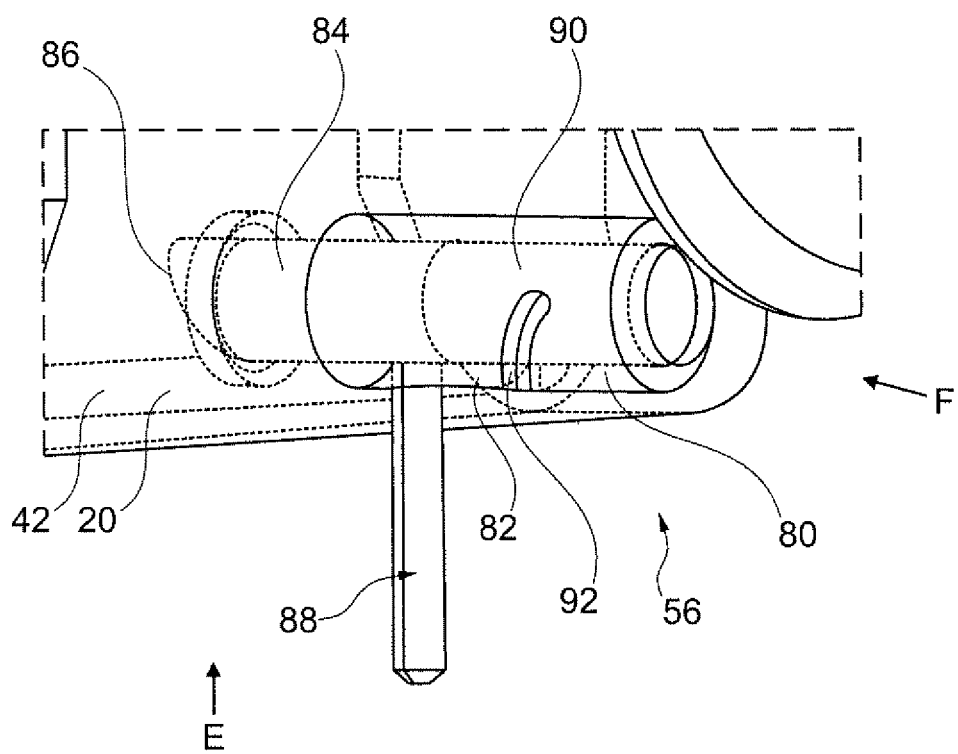
FIG. 5 shows a three-dimensional view of a pre-locking device of a fastening device according to an exemplary embodiment of the invention.

FIG. 5 shows the pre-locking device 56 that is located in the right-hand limb 20. The pre-locking device 56 essentially comprises a sleeve 80 with an elongated hole 82, a pressure member 84 with an inclined surface 86 and a handle 88 that is firmly connected to the pressure member 84, as well as a spring 90. The inclined surface 86 arranged on the pressure member 84 points against direction E. The pressure member 84 is kept in a locking position in that the spring 90 pushes onto the end of the pressure member 84, which end is opposite the inclined surface 86, thus keeping said pressure member under pre-tension in the locking position. In order to prevent rotation of the pressure member 84 and thus rotation of the inclined surface 86, the handle 88 extends in the elongated hole 82. The elongated hole 82 in turn extends along the direction of longitudinal extension of the sleeve 80 on the side facing direction E.

The pressure member 84 can be dislocated to a release position. To this effect the pressure member 84 is dislocated against the spring force F until the foremost point of the inclined surface 86 extends so as to be either flush with the groove bottom 40 or to be further back, relative to the groove bottom 40, against the direction F. In order to be able to lock the pressure member 84 in the release position, the handle 88 can be inserted into the circumferential groove 92.

Figure 6:
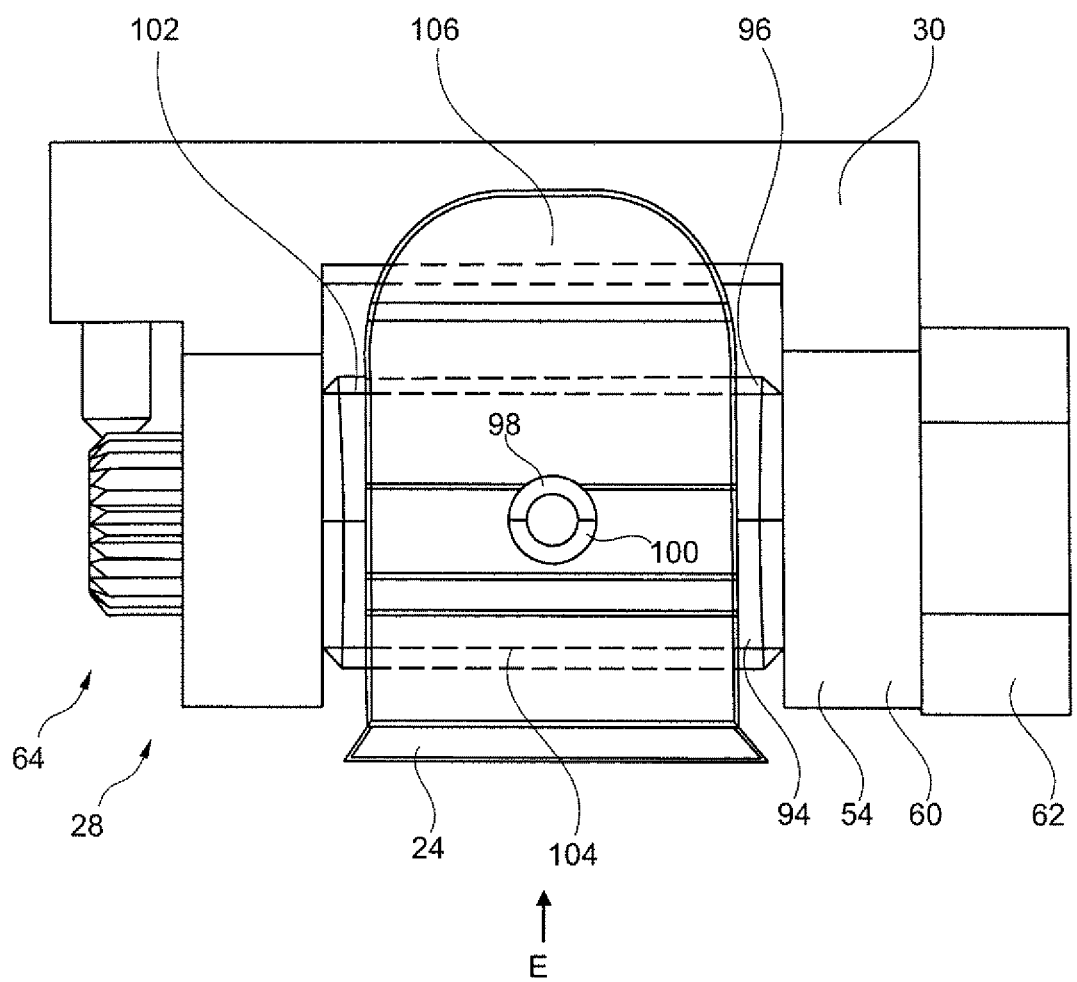
FIG. 6 shows a dislocation arrangement of a fastening device according to an exemplary embodiment of the invention for dislocating a fork head relative to a base body.

FIG. 6 shows a dislocation arrangement for dislocating a fork head 24 relative to a base body 30. As already mentioned at an earlier point in time, the arbor 28 is held in the transverse holes 60 of the two limbs 58. Between the limbs 58 a bush 94 is held without any play but in a rotatable manner, through the central hole (not shown) of which bush 94 the arbor 28 extends. On its outside the bush 94 comprises an external thread 96. The bush 94 is connected to the arbor 28 in such a way that across the direction of longitudinal extension of the arbor 28 there is a transverse hole 98 that is flush with the bush 94, through which transverse hole 98 a clamping sleeve 100 is installed in such a way that it firmly connects the bush 94 to the arbor 28, while its ends are further back relative to the thread root 102 of the external thread 96. In order to install the clamping sleeve 100 there is a correspondingly placed through-opening in the fork head 24. The external thread 96 engages an internal thread 104 that has been made in the fork head 24. At its end facing the direction of insertion E the fork head 24 is U-shaped with two limbs 106 whose interior is supported by the base body 30.

By rotation of the arbor 28 on the hexagonal head 62 the bush 94 is rotated, and with it the external thread 96 that has been cut onto the bush 94. Consequently the internal thread 104 moves with the fork head 24 relative to the external thread 96. In addition, the fork head 24 is supported, by way of its two limbs 106, on the base body 30. These limbs 106 prevent a situation in which torsional forces, which can be generated either during adjustment as a result of possible friction in the thread 96, 104 or during operation as a result of longitudinal forces or transverse forces which may be generated by the hatrack 4 (not shown), can lead to rotation of the fork head 24 relative to the base body 30.

To prevent a situation in which the arbor 24 independently rotates during operation, this is effectively prevented by the blocking device 64 described in detail in the next figure.

Figure 7:
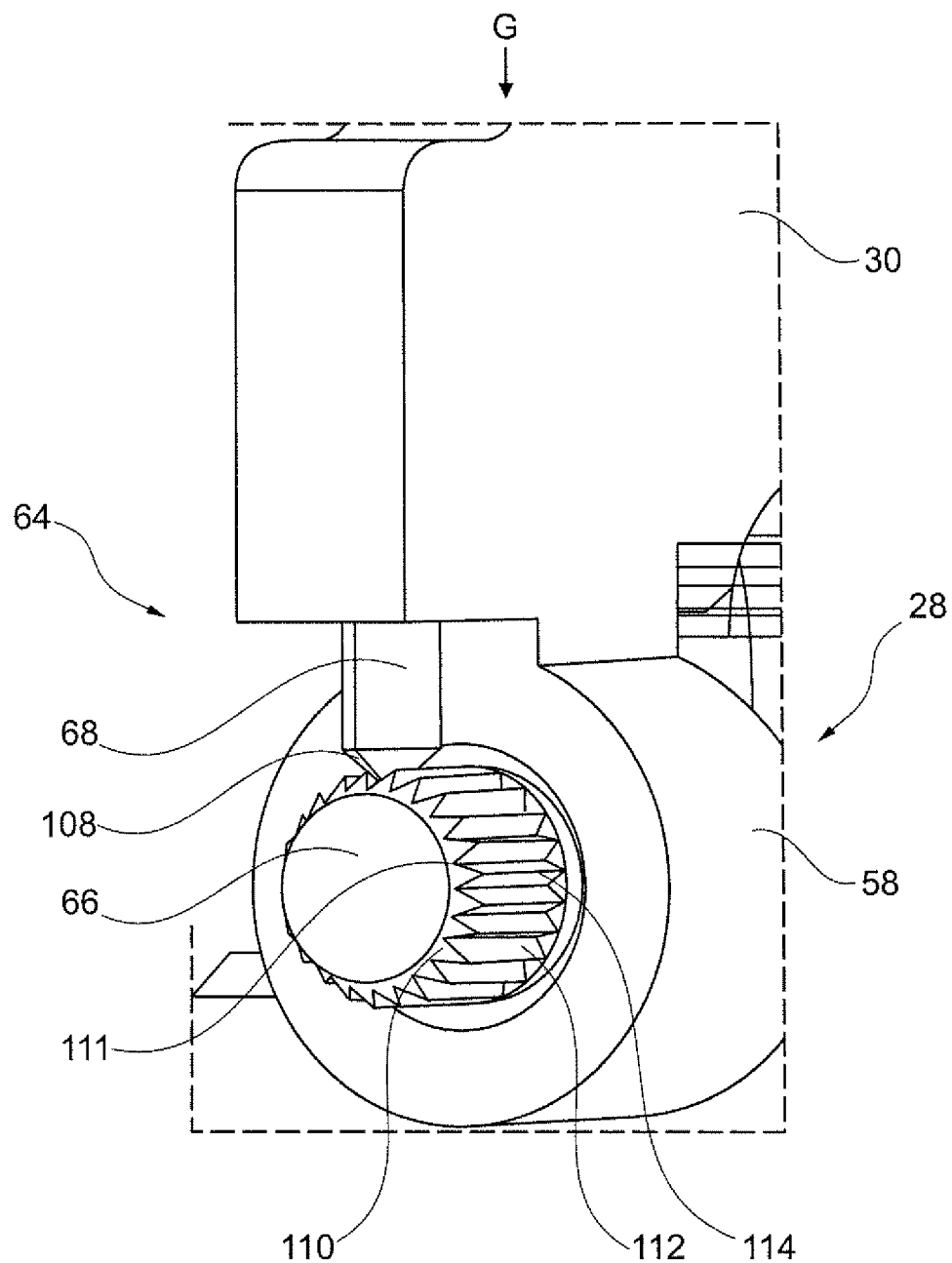
FIG. 7 shows a blocking device of an arbor of the dislocation arrangement shown in FIG. 6.

FIG. 7 shows the blocking device 64 that acts on the end of the arbor 24, which end is opposite the hexagonal head 62. In this arrangement the spur-toothed gearwheel 66 with its teeth 110 is firmly butt-joined to the edge of the arbor 28, which edge is opposite the hexagonal head receiver 62, in such a way that the teeth 110 extend in longitudinal direction of extension of the arbor 28. The figure further shows the way the locking element 68, which is pre-tensioned in the direction of the gearwheel 66, by means of a head 108 that resembles a cone, is pushed between two adjacent teeth 110, in other words into a tooth space 111. Each tooth 110 comprises two tooth faces 112 that meet in a tip 114 of the tooth.

When the arbor 28 is rotated, the pre-tensioned locking element 68 is dislocated in that the cone 108 is pushed, by the tooth face 112 that engages the cone 108, against the direction of force G. As soon as the cone 108 has moved over the tip 114 of the tooth the pre-tension device pushes the cone into the adjacent base 111 of the tooth and in this way fixes the gearwheel 66, and thus the arbor 28, in this position.

Figure 8:
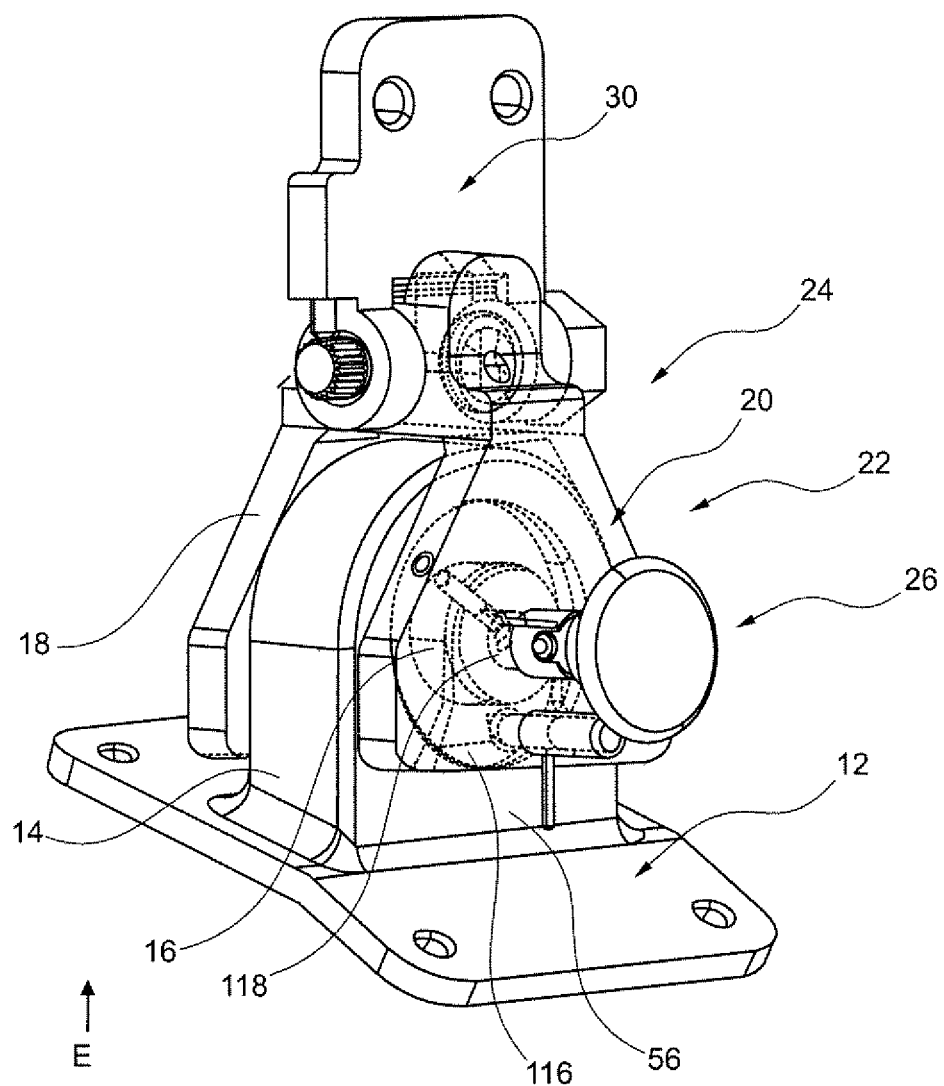
FIG. 8 shows the fastening device from FIG. 3 with an attachment part of the hatrack.

FIG. 8 shows the complete fastening device 2. It corresponds to the illustration from FIG. 3, supplemented by the attachment plate 12, the web 14 that is firmly connected to the attachment plate 12, and the cylindrical eye 16 that has been formed to the web. In the web 14 there is a ring-shaped groove 116 around the eye 16. This groove 116 ensures that the pressure member 84 of the pre-locking device 56 can project further in the direction of the left-hand limb 18 than the depth of the groove 38 in the right-hand limb 20. Thus the overlap between the pressure member 84 of the pre-locking device 56 and the eye 16, and thus the support area, is increased.

In order to install the hatrack 4' (not shown in this figure) the main bolt 26 rests in the unlocked position, thus releasing the entire width between the two limbs 18, 20 of the fork 22 of the fork head 24. The pre-locking device 56 is in the locking position so that the pressure member 84 projects into the fork 22 of the fork head 24. By inserting the eye 16 in the direction of insertion E into the fork 22, "catching" of the eye 16 takes place at first by means of the insertion aids 40 formed on the two limbs 18, 20. Subsequently the eye 16 is guided by the insertion aids 40 into the groove 38. The groove 38 prevents a situation in which the eye 16, and thus the hatrack 4 finally installed with the eye 16, can yield laterally, across the direction of insertion E. By sliding the eye 16 further in the direction E, the eye 16 dislocates the pressure member 84 at least to near the release position in that the inclined surface 86 of the pressure member 84 slides away at the eye 16. The pressure member 84 of the pre-locking device 56 reaches the locking position again for the first time when an opening 118 that is located in the eye 16 reaches the pressure member 84, and the pressure member is pushed into the opening 118 due to pre-tension. The pressure member 84 of the pre-locking device 56 reaches the locking position for the second time when the eye 16 has been moved completely beyond the pressure member 84 and when the pressure member projects into the groove 116 of the web 14. In this pre-locking position the eye 16, or the hatrack 4, rests on the pressure member 84. This procedure is carried out on all the fastening devices 2 affixed to a hatrack. It may depend on the installation situation as to whether in a first installation step the eye 16 on all the fastening devices 2 is at first only inserted to such an extent that the pressure member 84 of the pre-locking device 56 moves into the opening 118 of the eyes 16, thus securing the hatrack 4 in this position, and in a second work step the hatrack 4 is then guided on all the fastening devices 2 right to the pre-locking position, or whether the hatrack 4 on all the fastening devices 2 by means of a single installation step is moved right to the pre-locking position. After the hatrack 4 has reached the pre-locking position, the push bolt 26, which is in the unlocked position, is moved through the opening 118 of the eye 16, which opening 118 is now in front of the main bolt 26, and through the transverse hole 32 of the left-hand limb 18 into its locked position. In this process the cone 78 (see FIG. 4) facilitates threading the main bolt 26 into the opening 118 of the eye 16. Projection of the push button 124 into the opening 122 of the sleeve 120 ensures that the main-bolt securing device 52 pushes against the flat part 54 of the main bolt 26, thus securing the main bolt 26 against unintended dislocation. The push button 124 also prevents rotation of the main bolt 26 relative to the fork head 24. This installation step completes the installation procedure. The main bolt 26, which is more strongly dimensioned when compared to the pressure member 84, takes up the static and dynamic forces that act on the hatrack 4 during operation, and introduces said forces to the base body 30 and subsequently to the substructure 6 by way of the fork 22 of the fork head 24.

Reconfiguration of a passenger cabin or carrying out repair and maintenance work may make it necessary to deinstall the at least one hatrack 4.

In order to deinstall the hatrack 4, first the main bolt 26 is moved from its locked position to the unlocked position. In the unlocked position the main bolt 26 completely releases the eye 16. The eye 16 then rests on the pressure member 84 of the pre-locking device 56 that is in the locking position. By moving the pressure member 84 from the locking position to the release position, here again the eye 16 is completely released. To this effect the handle 88 (see FIG. 5) of the pressure member 84 is dislocated into the groove 92 of the sleeve 80 of the pre-locking device 56, which prevents the pressure member 84 from unintentionally being pushed into the locked position by the pre-tension of the spring 90. After this unlocking process has been completed, the eye 16 can be removed from the fork 22 of the fork head 24. Access for dislocation of the main bolt 26 from the locked position to the unlocked position and for dislocation of the pre-locking device 56 from the locking position to the release position takes place in the same direction so that the technician does not have to change his or her working position during deinstallation on a fastening device 2. After this deinstallation step has been carried out on all the fastening devices 2, the hatrack 4 is no longer connected to the substructure 6. This deinstallation step completes deinstallation of the hatrack.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

| List of reference characters | |
|---|---|
| 2 | Fastening device |
| 4 | Hatrack |
| 6 | Substructure |
| 8 | Tie rod |
| 10 | Frame element |
| 12 | Attachment plate |
| 14 | Web |
| 16 | Eye |
| 18 | Left-hand limb |
| 20 | Right-hand limb |
| 22 | Fork |
| 24 | Fork head |
| 26 | Main bolt |
| 28 | Arbor |
| 30 | Base body |
| 32 | Transverse hole |
| 34 | Interior wall of the left-hand limb |
| 36 | Interior wall of the right-hand limb |
| 38 | Groove |
| 40 | Groove bottom |
| 42 | Groove wall |
| 44 | Edge |
| 46 | Insertion aid |
| 48 | Inclined insertion surface on the groove bottom |
| 50 | Inclined insertion surface on the groove wall |
| 52 | Main-bolt securing device |
| 54 | Flat part |
| 56 | Pre-locking device |
| 58 | Limb on the base body |
| 60 | Transverse hole |
| 62 | Hexagonal head |
| 64 | Blocking device |
| 66 | Gearwheel |
| 68 | Locking element |
| 70 | Operating knob |
| 72 | Groove |
| 74 | Projection |
| 76 | Cone |
| 78 | Highest point of the cone |
| 80 | Sleeve |
| 82 | Elongated hole |
| 84 | Pressure member |
| 86 | Inclined surface |
| 88 | Handle |
| 90 | Spring |
| 92 | Groove |
| 94 | Bush |
| 96 | External thread |
| 98 | Transverse hole |
| 100 | Clamping sleeve |
| 102 | Thread root |
| 104 | Internal thread |
| 106 | Limb |
| 108 | Head |
| 110 | Tooth |
| 111 | Tooth space |
| 112 | Tooth face |
| 114 | Tip of the tooth |
| 116 | Groove |
| 118 | Opening of the eye |
| 120 | Sleeve |
| 122 | Opening |
| 124 | Push button |
| 126 | Operating device |
| E | Direction of insertion |
| F | Direction of force |
| G | Direction of force |

The invention claimed is:

1. A fastening device for snap-and-click installation of a hatrack to a substructure of a means of locomotion, comprising:

a fork head having a fork comprising first and second limbs, wherein the first and second limbs comprise a first and a second opening, respectively;

a main bolt displaceable, along a longitudinal direction of extension of the main bolt, between a locked position and an unlocked position, wherein the main bolt in the locked position is held in the first and second openings, and in the unlocked position is held only in one of the first and second openings;

an eye configured such that in an installed state thereof, the eye is received between the first and second limbs, wherein the main bolt in the locked position is configured to engage the eye such that the eye is connected to the fork head, and wherein the main bolt in the unlocked position is configured to completely release the eye;

a pre-locking device comprising a thrust piece, on at least one of the first and second limbs, configured and arranged such that the thrust piece is dislocatable between a locking position wherein the thrust piece is configured to project into the fork and to hold the eye thereon and a release position wherein the eye is released from the thrust piece, a main-bolt securing device dislocatable between an engaged position and a disengaged position, wherein in the engaged position, the main-bolt securing device is configured to secure the main bolt at least in one of the locked position and the unlocked position; and wherein, when the main bolt is in the unlocked position and the thrust piece is in the locking position, the eye is configured to rest in a first locking position on the thrust piece, and when the main bolt is in the unlocked position and the thrust piece is in the release position, the eye is configured to be completely released from the thrust piece.

2. The fastening device of claim 1, wherein the thrust piece comprises an inclined surface at a first end thereof, and wherein, when the thrust piece is in the locking position, the inclined surface makes it possible to slide the eye into the fork of the fork head and prevents withdrawal of the eye from the fork.

3. The fastening device of claim 1, wherein the thrust piece is configured to be locked in the release position and is pre-tensioned in the direction to the locking position.

4. The fastening device of claim 1, wherein, when the eye is in the pre-locking position, as a result of dislocation of the main bolt from the unlocked position through the eye and into the locked position, relief between the thrust piece and the eye is caused.

5. The fastening device of claim 1, wherein at least one of the facing interior walls of the first and second limbs comprises a groove such that during installation the eye is guided by the groove into the pre-locking position.

6. The fastening device of claim 1, wherein the main-bolt comprises a flat part, wherein the main-bolt securing device is configured to engage the flat part when the main bolt is in the locked position and the main-bolt securing device is in the engaged position, and wherein by rotating the main bolt the main-bolt securing device is configured to be released, and wherein a first end of the main bolt is shaped such that when the main-bolt securing device is in the engaged position the main-bolt securing device is configured to prevent dislocation of the main bolt beyond the unlocked position.

7. The fastening device of claim 1, wherein the fork head is connected to a base body that is firmly connected to the substructure in such a way that the fork head can be dislocated relative to the base body.

8. The fastening device of claim 7, further comprising a dislocation arrangement comprising:

first and second limbs that at least in partial regions are parallel, which first and second limbs are connected to a first side of the base body, wherein first and second limbs comprises a first and a second openings, respectively, and wherein the first and second openings are aligned;

an arbor that is rotatably held in the first and second openings;

a bush, between the first and second limbs, with an external thread, wherein the bush is firmly connected to the arbor, and the bush is rotatable between the first and second limbs without there being any play therebetween; and an internal thread, located in the fork head, wherein the internal thread of the fork head engages the external thread of the bush, and wherein the fork head is configured such that by rotating the arbor the fork head can be dislocated between the first and second limbs along the arbor;

wherein the arbor comprises first and second ends, wherein on the first end a tool holding fixture is formed, and on the second end a blocking device is formed that prevents independent rotation of the arbor.

* * * * *